United States Patent
Abhinav et al.

(10) Patent No.: US 11,157,847 B2
(45) Date of Patent: Oct. 26, 2021

(54) INTELLIGENT CROWDSOURCED RESOURCE ASSISTANT

(71) Applicant: Accenture Global Solutions Limited, Dublin (IE)

(72) Inventors: Kumar Abhinav, Bangalore (IN); Sakshi Jain, Bangalore (IN); Alpana Dubey, Bangalore (IN); Gurpriya Kaur Bhatia, New Delhi (IN); Blake McCartin, Chicago, IL (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 464 days.

(21) Appl. No.: 15/789,418

(22) Filed: Oct. 20, 2017

(65) Prior Publication Data
US 2019/0122162 A1    Apr. 25, 2019

(51) Int. Cl.
| | |
|---|---|
| *G06Q 10/06* | (2012.01) |
| *G06Q 50/00* | (2012.01) |
| *G06Q 30/08* | (2012.01) |
| *G06N 5/04* | (2006.01) |
| *G06F 16/33* | (2019.01) |

(52) U.S. Cl.
CPC ..... *G06Q 10/063118* (2013.01); *G06Q 30/08* (2013.01); *G06Q 50/01* (2013.01); *G06F 16/3344* (2019.01); *G06N 5/04* (2013.01)

(58) Field of Classification Search
None
See application file for complete search history.

(56) References Cited

U.S. PATENT DOCUMENTS

| | | | |
|---|---|---|---|
| 7,881,957 B1* | 2/2011 | Cohen | G06Q 30/08 |
| 7,885,844 B1* | 2/2011 | Cohen | G06Q 10/10 |
| 10,275,839 B2* | 4/2019 | Wang | G06Q 30/0282 |
| 10,346,803 B2* | 7/2019 | Pande | G06Q 10/10 |
| 10,607,189 B2* | 3/2020 | Kenthapadi | G06F 7/08 |
| 10,643,182 B2* | 5/2020 | Cengiz | G06Q 10/1053 |
| 2006/0106675 A1 | 5/2006 | Cohen et al. | |
| 2012/0197733 A1* | 8/2012 | Skomoroch | G06Q 30/02 705/14.66 |
| 2013/0096968 A1 | 4/2013 | Van Pelt et al. | |
| 2014/0214467 A1 | 7/2014 | Asur et al. | |

(Continued)

FOREIGN PATENT DOCUMENTS

EP    2348477 A1    7/2011

OTHER PUBLICATIONS

Yuen et al., TaskRec: A Task Recommendation Framework in Crowdsourcing Systems, Published online: Feb. 6, 2014 © Springer Science+Business Media New York 2014—Neural Process Lett (2015) 41:223-238 (Year: 2015).*

(Continued)

*Primary Examiner* — Brian M Epstein
*Assistant Examiner* — Darlene Garcia-Guerra
(74) *Attorney, Agent, or Firm* — Crowell & Moring LLP

(57) ABSTRACT

A crowdsource assistant provides guidance to crowdsource resources navigating a crowdsource platform to bid for and be accepted to accomplish tasks. The crowdsource assistant utilizes machine learning to train similarity computation models that improve the crowdsource assistant's computing capability to generate more relevant recommendations to a resource in a faster and more efficient manner.

17 Claims, 12 Drawing Sheets

(56) References Cited

U.S. PATENT DOCUMENTS

| | | | |
|---|---|---|---|
| 2014/0236852 A1* | 8/2014 | Emmerton | G06Q 10/1053 |
| | | | 705/321 |
| 2014/0372331 A1* | 12/2014 | Willis | G06Q 50/01 |
| | | | 705/320 |
| 2015/0324467 A1* | 11/2015 | Belton, Jr. | G06F 21/6218 |
| | | | 707/722 |
| 2016/0092998 A1* | 3/2016 | Goel | G06Q 50/01 |
| | | | 705/319 |
| 2018/0039946 A1* | 2/2018 | Bolte | G06Q 50/2057 |
| 2018/0096306 A1* | 4/2018 | Wang | G06Q 50/01 |
| 2018/0121879 A1* | 5/2018 | Zhang | G06Q 10/063112 |
| 2018/0158163 A1* | 6/2018 | Zhang | G06Q 50/2057 |
| 2019/0087783 A1* | 3/2019 | Wang | G06Q 10/1053 |

OTHER PUBLICATIONS

Schnitzer et al., Perceived Task Similarities for Task Recommendation in Crowdsourcing Systems, WWW '16 Companion: Proceedings of the 25th International Conference Companion on World Wide Web, Apr. 2016, pp. 585-590 (Year: 2016).*

Baba, Yukino, Kei Kinoshita, and Hisashi Kashima. "Participation recommendation system for crowdsourcing contests." Expert Systems with Applications 58 (2016): 174-183 (Year: 2016).*

Examination Report No. 1 in Australian Application No. 2018229553, dated May 31, 2019, 7 pages.

Examination Report No. 2 for corresponding Australian application No. AU 2018229553 dated Dec. 18, 2019, 4p.

Examination Report No. 3 for corresponding Australian application No. AU 2018229553 dated Apr. 15, 2020, 3p.

* cited by examiner

1100

| | $W_1$ | $W_2$ | $W_3$ | $W_4$ | $W_5$ |
|---|---|---|---|---|---|
| $W_1$ | 1 | 0.189 | 0.069 | 0.233 | -0.04 |
| $W_2$ | 0.189 | 1 | .024 | 0.012 | 0.109 |
| $W_3$ | 0.069 | 0.242 | 1 | 0.189 | -0.019 |
| $W_4$ | 0.233 | 0.012 | 0.189 | 1 | 0.083 |
| $W_5$ | 0.042 | 0.109 | -0.019 | 0.083 | 1 |

Figure 11

INTELLIGENT CROWDSOURCED RESOURCE ASSISTANT

TECHNICAL FIELD

This application relates to management of resources allocated to crowdsourced tasks, including the intelligent assistance of the resource in creating a profile for the resource within a crowdsource platform, recommending tasks for the resource within the crowdsource platform, recommending crowdsource marketplaces for the resource within the crowdsource platform, and presenting advice for the resource to achieve utilization goals within the crowdsource platform. This application further relates to communication with, and control over, geographically distributed resources performing tasks provided by the crowdsource platform.

BACKGROUND

The global proliferation of high speed communication networks has created unprecedented opportunities for geographically distributed resource interaction. However, while the opportunities exist and continue to grow, the realization of those opportunities has fallen behind, and new technical problems arise from the utilization of the geographically distributed resources.

To help consolidate crowdsource task posters with crowdsource resources that will bid on the opportunity to be utilized on posted tasks, crowdsource platforms have been created to provide a meeting space for such interactions to occur. However, even within these new crowdsource platforms, there exists technical challenges that arise from a resource's attempt to identify and select tasks within the crowdsource platform that aligns with the resource's interests, skills, past utilization history, and future goals, as well as the goals and preferences of the entities that post the tasks to the crowdsource platform.

BRIEF DESCRIPTION OF THE DRAWINGS

FIG. 11 shows an exemplary similarity matrix.

DETAILED DESCRIPTION

Figure 1:
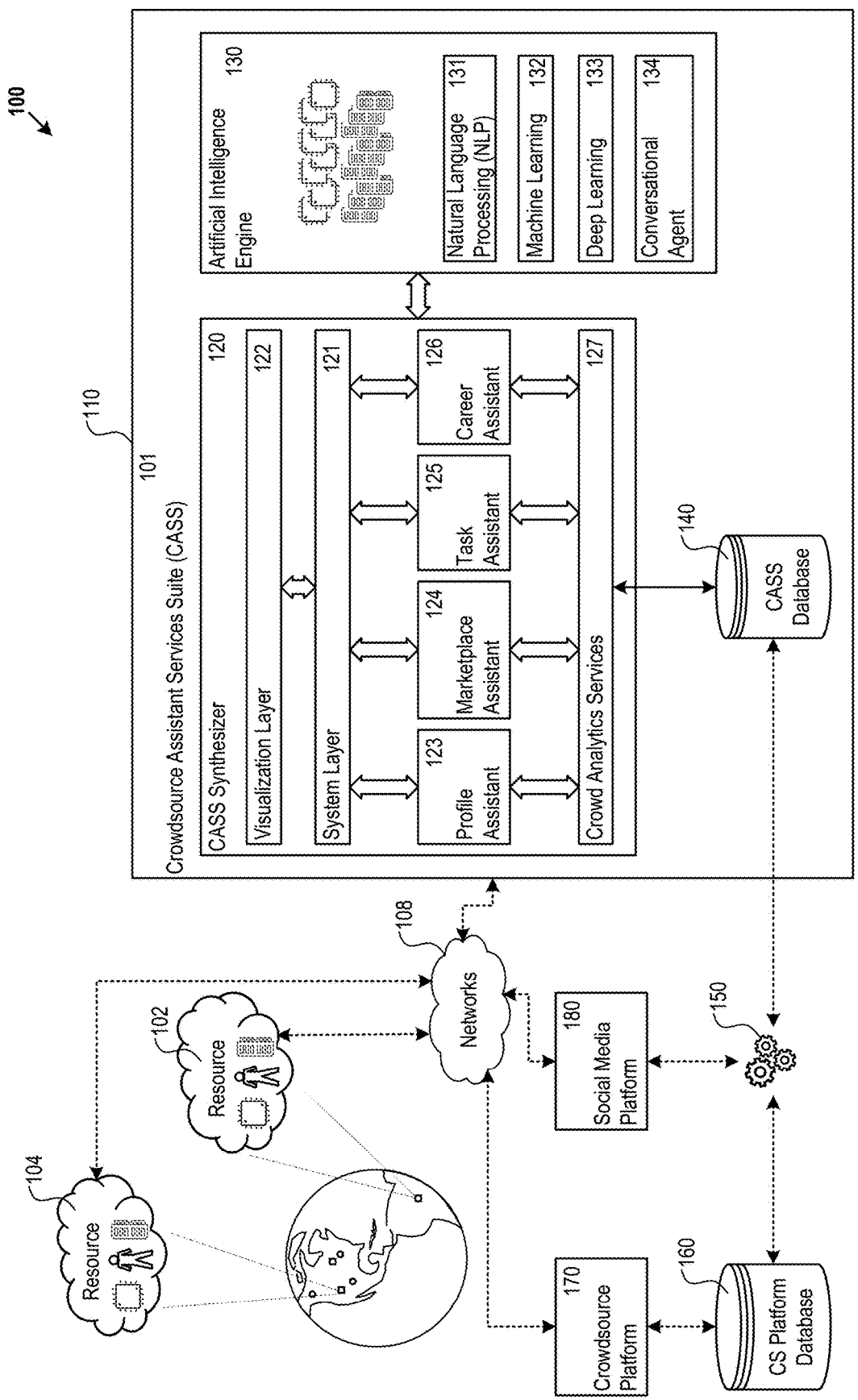
FIG. 1 shows an example of a global network architecture.

With the continued improvements in network capabilities, the technological field of crowdsourcing is now applied to many enterprise projects to take advantage of utilizing a new stable of resources that are not bound by geography. With the new emergence of crowdsourcing resources, also comes new technical problems have also emerged that arise from the particular application of crowdsourcing resources. One solution for bringing together remote resources to connect them to work on crowdsource tasks, is the creation of a crowdsource platform.

A crowdsource platform may include a marketplace where project managers post tasks they want accomplished by crowdsourced resources. The crowdsource platform may also include a social media aspect where a resource sets up a working resource profile that describes, for example, the resource's attributes, past utilization history (e.g., past work history), skillsets, recommendations, portfolio of past work, or other defining attributes. A project manager reviewing resources that have applied to accomplish their posted tasks may consider these resource profiles when deciding whether to utilize the resource. In this way, the crowdsource platform further promotes the benefits of crowdsourcing by providing an online community where project managers and resources from any geographical location can visit to post tasks and apply for tasks, respectively.

To further improve crowdsource platforms, a crowdsource assistant services suite (CASS) is described for providing additional assistance to resources and project managers. The CASS relies, at least in part, on an artificial intelligence engine to provide improvements to computing capabilities in the form of generating more accurate recommendations, in a faster and more efficient manner. For example, the artificial intelligence engine may include one or more of a natural language processing engine, a machine learning engine, or a deep learning engine that work to parse through historical data related to the resource, project manager, and/or crowdsource platform, and generate accurate predictions and recommendations for resources based on the historical data. In particular, the machine learning engine is continuously trained to generate more accurate predictions and recommendations in a faster amount of time.

Resources may include any element or component utilized during the course of a task execution, whether specific individuals (e.g., a GUI programmer or other worker), hardware resources (e.g., CPU, memory and disk resources), software resources (e.g., algorithm or function packages, application software, operating systems, or database management systems), or combinations or software and hardware resources (e.g., virtual machines).

Project managers may include any element or component responsible for posting available tasks on the crowdsource platform to attract resources to bid on accomplishing the posted tasks, where the project manager is further responsible for selecting resources to accomplish their posted tasks. Project managers may be specific individuals (e.g., an enterprise employee), hardware resources (e.g., CPU, memory and disk resources), software resources (e.g., algorithm or function packages, application software, operating systems, or database management systems), or combinations or software and hardware resources (e.g., virtual machines).

Crowdsource tasks are posted to the crowdsource platform, and may described by one or more of the following task attributes: technology, industry, task name, task requirements, task summary, target platform on which a task will run, development methodology for the task, or other definable task attribute.

Although the exemplary embodiments described herein relate to the CASS being a separate bot running on top of a crowdsource platform to be applicable to various types of crowdsource platforms, in other embodiments the CASS may be directly integrated into a crowdsource platform.

Figure 2:
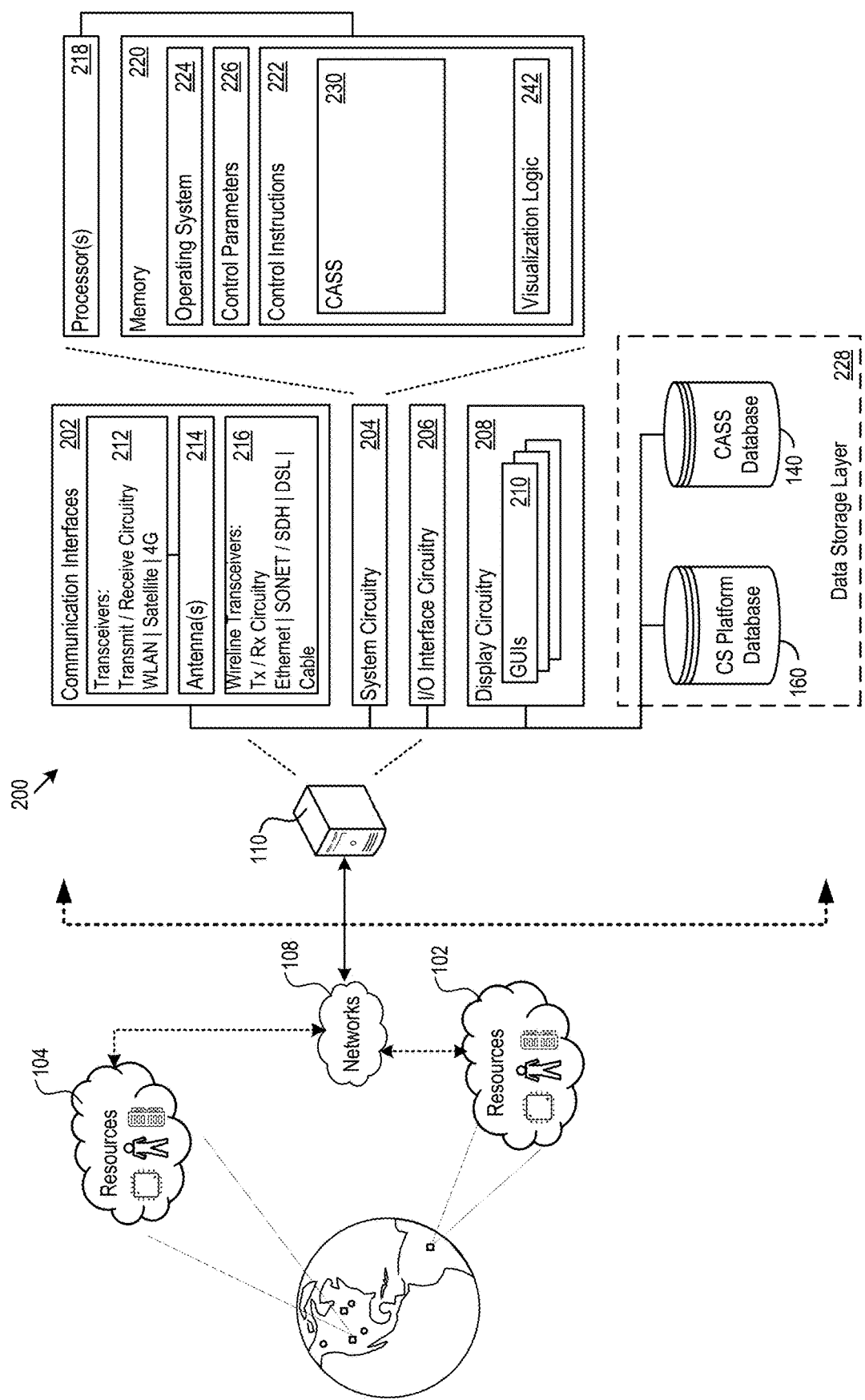
FIG. 2 illustrates an example implementation of a computing resource included in the global network architecture.

FIGS. 1 and 2 provide an exemplary context for the discussion below of the technical solutions provided by the CASS and the CASS architecture. The examples in FIGS. 1 and 2 show one of many possible different implementation contexts. In that respect, the technical solutions are not limited in their application to the architectures and systems shown in FIGS. 1 and 2, but are applicable to many other system implementations, architectures, and connectivity.

FIG. 1 shows a global network architecture 100. Connected through the global network architecture 100 are resources, e.g., resource 102 and resource 104, a crowdsource platform 170, a social media platform 180, and the CASS 101 running on the CASS computer architecture 110. The resource 102 and resource 104 are shown to be included as members within the crowdsource platform 170. The global network architecture 100 also includes an extraction engine 150 for extracting desired information from the crowdsource platform 170 and the social media platform 180, and communicating the extracted information to the CASS database 140. Although the extraction engine 150 is shown outside of the CASS computer architecture 110, the extraction engine 150 may be incorporated into the CASS computer architecture 110 according to some embodiments.

The resources included in the global network architecture 100 may be present at many different resource sites globally, and for certain types of resources (e.g., virtualized computing resources) the resource sites are service providers that host the resources. The resource sites and resources may be located in any geographic region, e.g., United States (US) East, US West, or Central Europe. In addition, any of the resources, resource sites, or components related to the resources, may provide resource descriptors attributed to the resources. The resource descriptors may include data that characterizes, defines, or describes the resources. A few examples of resource descriptors include data specifying abilities, speed, reliability, location, availability, languages, cost, capability, capacity, experience, skill descriptors, historical performance data, and execution capability data. In addition to being geographically distributed, resources and resource descriptors may also be present locally within an enterprise framework behaving as a project manager, or within the crowdsource platform 170 itself.

Throughout the global network architecture 100 are networks including, for example, the network 108. The network 108 provides connectivity between the resources, resource descriptors, service providers, enterprises, and other globally positioned entities. The networks 108 may include private and public networks defined over any pre-determined and possibly dynamic internet protocol (IP) address ranges. The network 108 may be representative of one or more networks.

The CASS computer architecture 110 is hosted at an enterprise location corresponding to the crowdsource platform 170, or other third-party vendor site. The CASS computer architecture 110 includes the components (e.g., hardware, software, circuitry) for operating the CASS 101. The enterprise location acts as a centralized control point over the processes executed by the CASS 101 to carry out assistance to the geographically distributed resources that are within the crowdsource platform 170. The tasks that are posted to the crowdsource platform 170 may be one that an enterprise needs to accomplish, either for itself or on behalf of other third parties. As will be described in more detail, the CASS 101 is executed on the CASS computer architecture 110 to provide assistance to the resources that are included within the crowdsource platform 170.

In the global network architecture 100 shown in FIG. 1, the CASS 101 includes both a CASS synthesizer 120 and an artificial intelligence (AI) engine 130. The CASS synthesizer 120 includes a profile assistant 123, a marketplace assistant 124, a task assistant 125, and a career assistant 126. Each of the profile assistant 123, the marketplace assistant 124, the task assistant 125, and the career assistant 126 include the hardware, software, and circuitry for implementing the respective corresponding features attributed to the different assistants as described herein.

A system layer 121 coordinates the operation and interactions among the profile assistant 123, the marketplace assistant 124, the task assistant 125, and the career assistant 126. In addition, the system layer 121 drives a visualization layer 122 that renders or outputs, for instance, a set of graphical user interfaces (GUIs) including visualizations, chat windows, and other presentations of information that facilitate the assistance to the resources, e.g. in HTML form or as digital video signals for driving displays. According to some embodiments, the CASS 101 may operate as a bot running on top of the crowdsource platform 170. In these embodiments, the visualization layer 122 controls the display of chat windows in a dedicated display area of a GUI of the crowdsource platform 170, or controls the display of chat windows to overlap with selected portions of a GUI of the crowdsource platform 170.

The AI engine 130 includes, for example, a natural language processing (NLP) engine 131, a machine learning engine 132, a deep learning engine 133, and a conversational agent 134. The NLP engine 131 receives textual data (e.g., resource profile, or task profile) and implements one or more known NLP techniques such as tokenizing the textual data, removing predetermined stop words from the textual data, performing stemming on the textual data, and generating a resulting vector representation of the textual data. The machine learning engine 132 receives data (e.g., past performance data) and applies one or more machine learning algorithms (e.g., Naive Bayes, decision tree, random forest) to train the machine learning engine 132 to perform future calculations (e.g., predictions) more faster, more efficiently, and/or more accurately. The deep learning engine 133 applies regression techniques on known data to generate more accurate predictions for relevant values (e.g., predict effective billing rates). While in communication with one or more of the profile assistant 123, the marketplace assistant 124, the task assistant 125, or the career assistant 126, the conversational agent 134 controls a chat bot to generate conversational messages that are displayed on a GUI displayed for the profile assistant 123, the marketplace assistant 124, the task assistant 125, or the career assistant 126. To generate the messages that are displayed by the chat bot, the conversational agent 134 references one or more of the NLP engine 131, the machine learning engine 132, or the deep learning engine 133.

The CASS computer architecture 110 also includes a CASS database 140. The CASS database stores information used by the CASS 101 to provide its assistance. For example, the CASS database 140 may store resource attribute information extracted from resource profiles uploaded to the social media platform 180. The CASS database 140 may also store resource attributes extracted from information stored on the crowdsource (CS) platform database 160. The information stored on the CS platform database 160 includes task profile descriptions, performance information related to resources accomplishing tasks offered by the crowdsource platform 170, resource profile information input to the crowdsource platform 170, and historical task information related to the crowdsource platform 170.

FIG. 2 shows an example implementation of the CASS computer architecture 110 as implemented on a computer device 200. The CASS computer architecture 110 includes communication interfaces 202, system circuitry 204, input/output (I/O) interface circuitry 206, and display circuitry 208. The visualization layer 122 generates the graphical user interfaces (GUIs) 210 locally using the display circuitry 208, or for remote visualization, e.g., as HTML, JavaScript, audio, and video output for a web browser running on a local or remote machine. Among other interface features, the GUIs 210 may render interfaces (e.g., chat windows) for presenting specific assistance to a resource relying on the CASS 101 within the crowdsource platform 170.

The GUIs 210 and the I/O interface circuitry 206 may include touch sensitive displays, voice or facial recognition inputs, buttons, switches, speakers and other user interface elements. Additional examples of the I/O interface circuitry 206 includes microphones, video and still image cameras, headset and microphone input/output jacks, Universal Serial Bus (USB) connectors, memory card slots, and other types of inputs. The I/O interface circuitry 206 may further include magnetic or optical media interfaces (e.g., a CDROM or DVD drive), serial and parallel bus interfaces, and keyboard and mouse interfaces.

The communication interfaces 202 may include wireless transmitters and receivers ("transceivers") 212 and any antennas 214 used by the transmit and receive circuitry of the transceivers 212. The transceivers 212 and antennas 214 may support WiFi network communications, for instance, under any version of IEEE 802.11, e.g., 802.11n or 802.11ac. The communication interfaces 202 may also include wireline transceivers 216. The wireline transceivers 216 may provide physical layer interfaces for any of a wide range of communication protocols, such as any type of Ethernet, data over cable service interface specification (DOCSIS), digital subscriber line (DSL), Synchronous Optical Network (SONET), or other protocol.

The system circuitry 204 may include any combination of hardware, software, firmware, or other circuitry. The system circuitry 204 may be implemented, for example, with one or more systems on a chip (SoC), application specific integrated circuits (ASIC), microprocessors, discrete analog and digital circuits, and other circuitry. The system circuitry 204 may implement any desired functionality in the CASS computer architecture 110, including the profile assistant 123, the marketplace assistant 124, the task assistant 125, and the career assistant 126, and the system layer 121, and the visualization layer 122. As just one example, the system circuitry 204 may include one or more instruction processor 218 and memory 220.

The memory 220 stores, for example, control instructions 222 and an operating system 224. In one implementation, the processor 218 executes the control instructions 222 and the operating system 224 to carry out any desired functionality for the CASS 101, including the functionality described below for the profile assistant 123, the marketplace assistant 124, the task assistant 125, and the career assistant 126, the system layer 121, and the visualization layer 122. The control parameters 226 provide and specify configuration and operating options for the control instructions 222, operating system 224, and other functionality of the CASS computer architecture 110.

The CASS computer architecture 110 may include a data storage layer 228 that hosts any number of local data repositories. In the exemplary computer device 200 shown in FIG. 2, the data storage layer 228 includes the CASS database 140, and may further include the CS platform database 160 for embodiments where the CASS 101 is integrated into the crowdsource platform 170. Although both the CASS database 140 and the CS platform database 160 are shown as two distinct components, according to some embodiments they may be part of a single database.

The control instructions 222 drive the functionality of the CASS computer architecture 110. For example, the control instructions 222 include instructions 230 for implementing the features of the CASS 101. The visualization logic 242 generates the GUIs 210 to provide interfaces for accomplishing display features of the CASS 101.

The features of the CASS 101 that control operation of the various components of the computer device 200, as well as the structure and content of the generated GUIs 210, improve the functioning of the underlying computer hardware included in the computer device 200 itself. That is, these features (among others described below) are specific improvements in the way that the underlying computer device 200 operates. The improvements facilitate more efficient, accurate, consistent, and precise execution of complex projects using disparate geographically distributed resources. The improved functioning of the underlying computer hardware itself achieves further technical benefits. For example, the execution of the CASS 101 on the CASS computer architecture 110 increases a processing time for generating accurate predictions and recommendations, while reducing reliance on computing resources.

Figure 3:
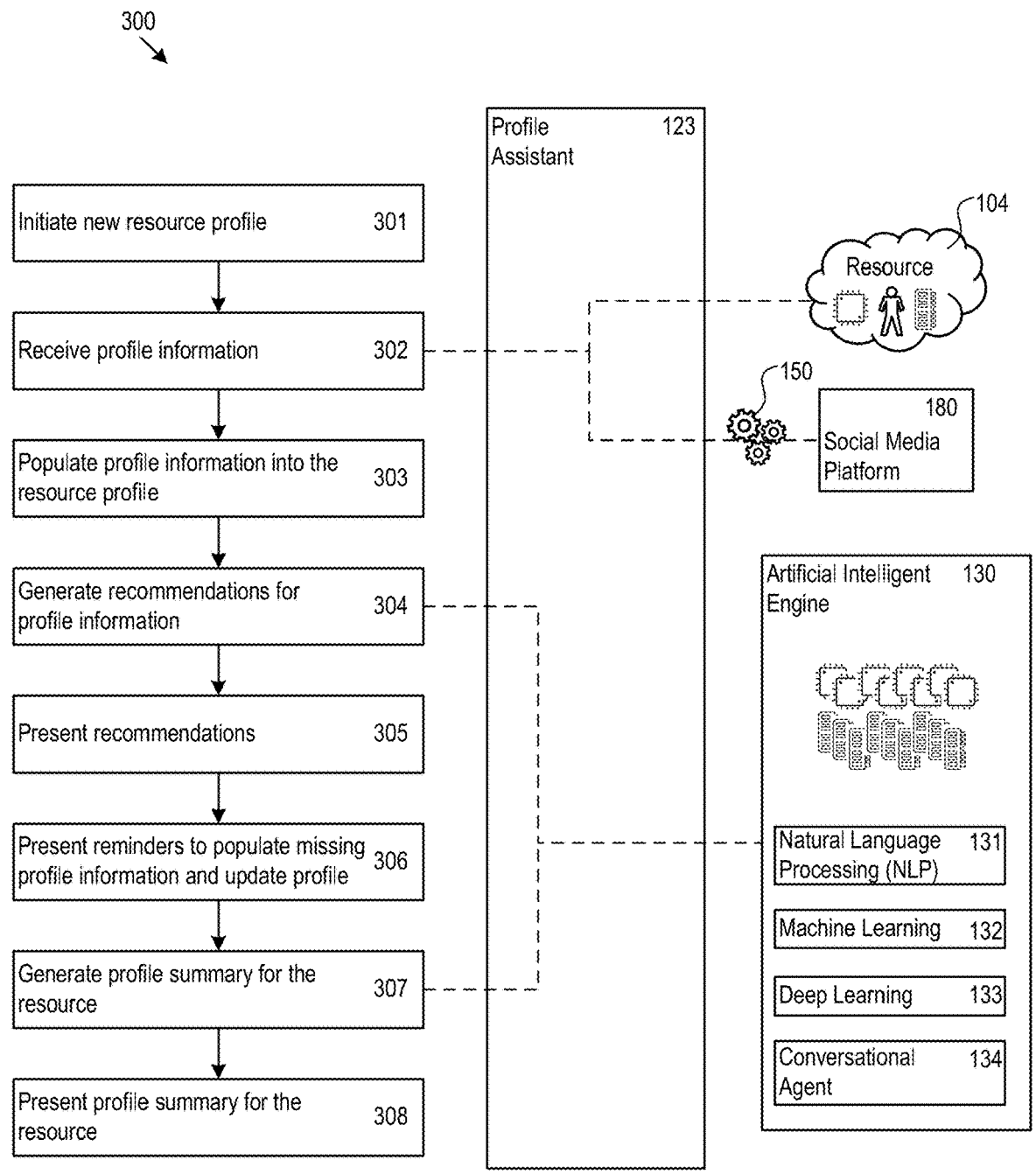
FIG. 3 shows an exemplary flow diagram of logic that the architecture may implement.

FIG. 3 shows a flow diagram 300 of logic describing an exemplary process for the CASS 101 to provide assistance to, for example, the resource 104 on the crowdsource platform 170. One or more of the processes included in the flow diagram 300 may be attributed to the profile assistant 123 of the CASS 101.

Figure 4:
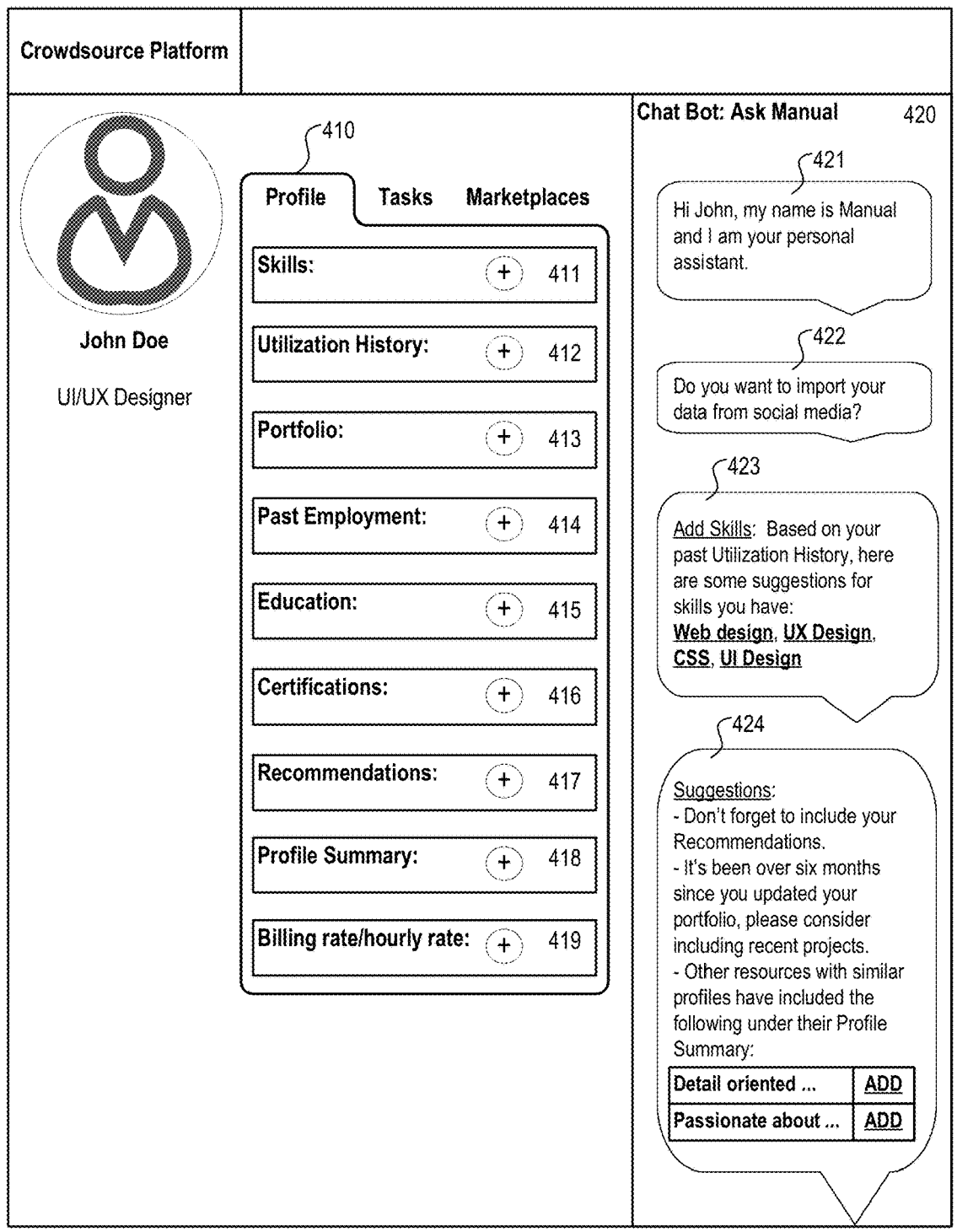
FIG. 4 shows a screen of an exemplary graphical user interface (GUI) presenting assistive features.

In one implementation, a new resource profile creation process is initiated for the resource 104 (301). The new resource profile may be initiated by the profile assistant 123, or the crowdsource platform 170, to obtain information on the resource 104. For example, FIG. 4 shows a screen 400 of an exemplary GUI generated by the crowdsource platform 170 for initiating a new resource profile for the resource 104, where the resource 104 is identified as John Doe who is a UI/UX designer. Profile information is described in predefined fields of a profile tab 410. Portions of the screen 400 are also controlled by the profile assistant 123 to provide assistive features generated by the profile assistant 123 to the resource 104. For example, a chat bot area 420 is controlled by the profile assistant 123. The profile assistant controls the chat bot area 420 to include a first chat window 421 displaying a welcoming message. The resource 104 itself may initiate the creation of the new resource profile upon joining the crowdsource platform 170.

After detecting the initiation of the new resource profile, the profile assistant 123 receives profile information (302). The resource 104 may directly input the profile information into the appropriate predefined fields on the screen 400, such as the skills field 411, utilization history field 412, portfolio field 413, past employment field 414, education field 415, certifications field 416, recommendations field 417, and profile summary field 418, that are shown to be included within the profile tab 410 of the screen 400 in FIG. 4. In addition or alternatively, one or more of the profile information may be received based on the resource 104 uploading a data file including the profile information. In addition or alternatively, one or more of the profile information may be received by the extraction engine 150 extracting the profile information from information on the resource 104 stored on the social media platform 180, as suggested by a second chat window 422 in the screen 400.

With the received profile information, the resource profile for the resource 104 is populated (303). For example, profile information relating to one or more of the predefined fields in the screen 400 shown in FIG. 4 may be populated into the resource profile for John Doe.

After populating the resource profile with the profile information, the profile assistant 123 generates recommendations for the profile information based on an analysis by the AI engine 130 (304). The AI engine 130 may compare the profile information in the resource profile to other similar resource profiles on the crowdsource platform, and generate recommendations for revising existing profile information accordingly. The AI engine 130 may also reference a goal attributed to the resource 104 when generating the recommended revisions, such that the recommended revisions is predicted to increase a probability that the goal is achieved (e.g., resource 104 is selected for a goal task), and wherein the recommended revisions reflect profile information for other resources in the crowdsource platform 170 that have achieved the goal. The AI engine 130 may also analyze the utilization history for the resource 104, and determine certain attributes for the resource 104 that are shown by the utilization history are not included in the existing profile information. When the AI engine 130 realizes that there may be missing profile information based on the analyzed utilization history, this may further be included in the recommendations.

After generating the recommendations, the profile assistant 123 presents the recommendations (305). For example, the screen 400 presents a fourth chat window 424 including a recommendation to revise the profile information included in the Profile Summary field. The recommendation presented in the fourth chat window 424 specifically includes two different options based on profile information found on similar resource profiles. Selecting either one of the two different options will add the recommended revisions to the Profile Summary field 418. The screen 400 also presents a third chat window 423 including a recommendation to add certain skills that were discovered from analyzing the utilization history of the resource 104. Selecting any one of the recommended skills will add them into the Skills field.

Periodically, or in response to detecting predetermined trigger events, the profile assistant 123 presents reminders to populate either missing profile information, or update existing profile information (306). For example, the fourth chat window 424 presented on the screen 400 also includes reminders to include missing profile information, as well as a reminder to update older profile information.

The profile assistant 123 further generates a profile summary for the resource 104 to include in the resource profile (307). The profile summary is generated to emulate profile summaries from similar resource profiles.

The generated profile summary is then presented on the crowdsource platform 170 (308). For example, the profile summary may be presented on the screen 400 to be included as part of the Profile Summary field 418.

Figure 5:
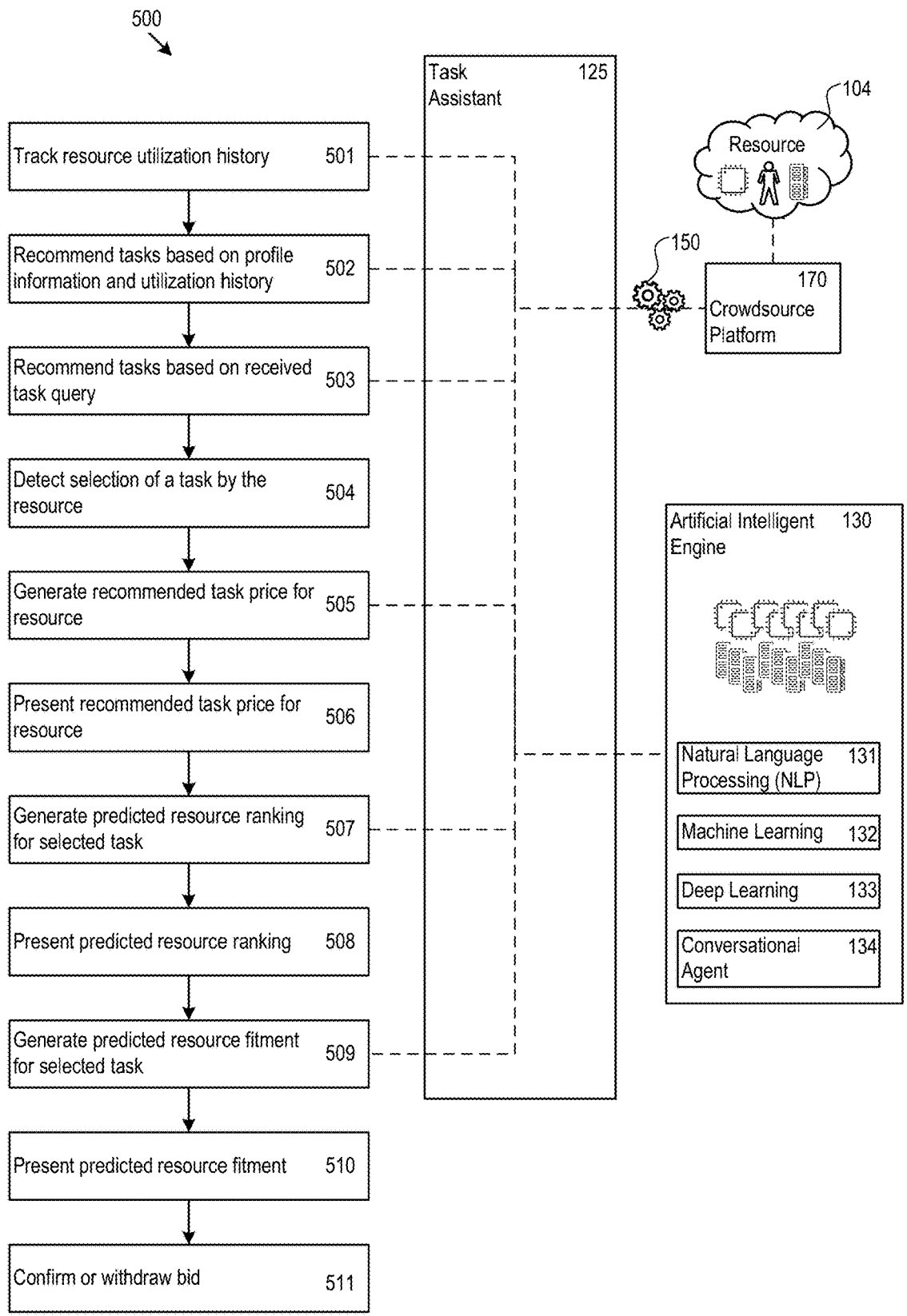
FIG. 5 shows another exemplary flow diagram of logic that the architecture may implement.

FIG. 5 shows a flow diagram 500 of logic describing an exemplary process for the CASS 101 to provide assistance to, for example, the resource 104 on the crowdsource platform 170. One or more of the processes included in the flow diagram 300 may be attributed to the task assistant 125 of the CASS 101.

The task assistant 125 tracks the utilization history of the resource 104 as the resource 104 bids on tasks posted to the crowdsource platform 170, and accomplishes tasks that are assigned through the crowdsource platform 170 (501). Included within the tracking of the utilization history of the resource 104, may be the tracking of performance attributes assigned to the resource 104 for having completed past tasks.

Figure 6:
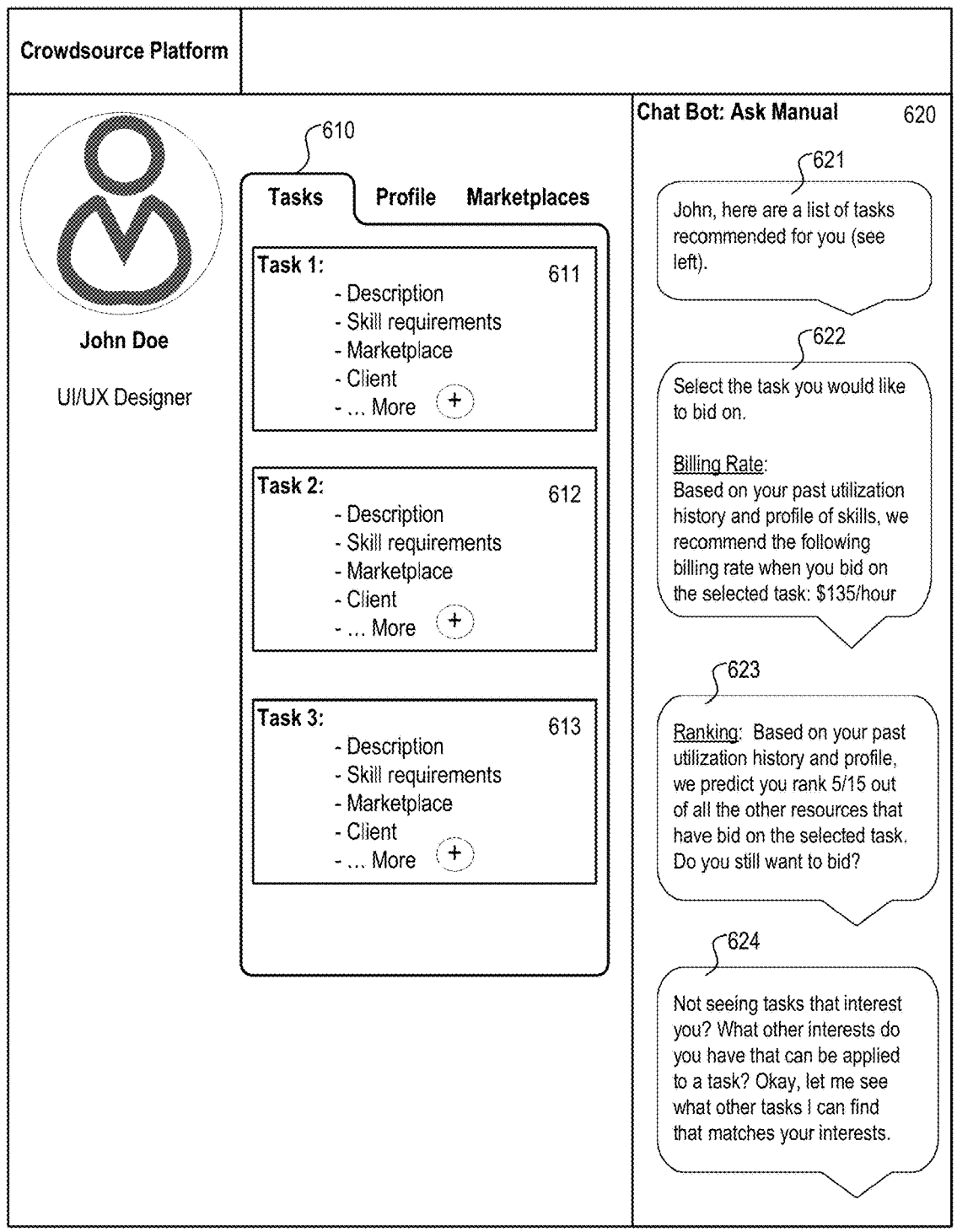
FIG. 6 shows a screen of an exemplary GUI presenting assistive features.

From the utilization history and profile information related to the resource 104, the task assistant 125 recommends one or more tasks that are available on the crowdsource platform 170 (502). The recommended tasks are selected by the AI engine 130 as being predicted to be of interest to the resource 104. FIG. 6 shows a screen 600 of an exemplary GUI generated by the crowdsource platform 170 for presenting tasks that are available on the crowdsource platform 170 to the resource. The tasks and their task information are presented in a tasks tab 610 (e.g., task 1 611, task 2 612, task 3 613). Portions of the screen 600 are also controlled by the task assistant 125 for presenting recommended tasks and other related information to the resource 104. For example, one or more of the tasks displayed within the tasks tab 610 may have been selected by the task assistant 125. The task assistant also controls a chat bot area 620 to provide assistive information to the resource 104. In screen 600 the chat bot area 620 is shown to include a first chat window 621 that presents a message related to the list of recommended tasks included in the tasks tab 610.

The resource 104 may directly input a search query searching for desired tasks on the crowdsource platform 170. The task assistant 125 may receive the search query, and recommend one or more tasks that are available on the crowdsource platform 170 based on the search query (503). The list of recommended tasks included in the tasks tab 610 may include tasks selected by the task assistant 125 based on one or more of the utilization history, profile information, search query, or a combination thereof.

From the list of recommended tasks included in the tasks tab 610, the resource 104 inputs a selection for a selected task. The selection input may be the actual bid submitted to the project manager of the task, or a pre-bid selection that confirms an interest in the task prior to submitting the actual bid. The task assistant 125 detects the selection input (504). The selection input is an indication that the resource 104 desires to be selected by the project manager to accomplish the task. In making their decision on whether to choose the resource 104 to accomplish the task, the project manager may rely on profile information for the resource 104, utilization history for the resource 104, a billing rate submitted with the bid by the resource 104, as well as consideration of other resources that have submitted bids to accomplish the task.

The task assistant 125, via the AI engine 130, considers the past utilization history and the profile information for the resource 104 to generate a recommended task price to submit with the bid (505). The recommended task price may be a billing rate that is a reflection of the resource 104's level of experience and performance from having accomplished the same, or similar, tasks. The recommended task price is generated by the AI engine 130 based on a consideration of task specific features such as description of the task, title of the task, duration of the task, skills required to complete the task, or a combination thereof. The AI engine 130 may also consider resource specific features such as country, skills, past tasks completed by the resource, profile summary, rating, average charged billing rate on past similar tasks completed by the resource or a combination thereof. The AI engine 130 may also consider task poster features such as country, number of hires, past hires, average rewards paid for similar tasks in the past, or a combination thereof.

The recommended task price is presented, for example, within a second chat window 622 included in the chat bot area 620 of the screen 600 shown in FIG. 6 (506). Here, the recommended task price is shown to be a billing rate of $135/hour. The billing rate may be submitted with the bid, submitted immediately after submitting the bid, or considered by the task assistant 125 when generating a resource ranking.

The crowdsource platform 170 may implement a points system, where resources are given a set value of points to submit along with their bids. The value of points that are submitted with the bid may not be reimbursed even when the bid is not accepted. Therefore, there is a motivation to provide an accurate depiction for whether the resource 104 has a good probability of having their bid accepted by the project manager. To provide an improvement, according to some embodiments the task assistant 125, via the AI engine 130, generates a ranking of resources that have bid on the task (507). The resource rankings are determined by the AI engine 130 to rank the resources, including the present resource having provided the selection input, that have bid on the task in an order of predicted fit with the task. The predicted fit may rank resources higher in the resource rankings that are predicted to perform higher, cost less, meet a preference of the project manager, or other criteria related to the task.

According to some embodiments, the resource rankings are presented to the resource 104 (508). The presentation of the resource rankings is shown by a third chat window 623 included within the chat bot area 620 of the screen 600. The presentation of the resource rankings provides an additional level of assurance to the resource 104 on whether their bid will be accepted by the project manager of the selected task.

The task assistant 125, via the AI engine 130, considers the past utilization history and the profile information for the resource 104 in comparison to preferences identified by a requester (e.g., task manager) of the selected task to generate a recommended resource fitment (509). The task assistant 125, via the AI engine 130, may further consider a past resource utilization history of the requester for similar tasks as the selected task, to obtain attribute information (e.g., profile information) of previous resources that are determined to have successfully accomplished the similar tasks for the requester in the past. With this information, the task assistant 125, via the AI engine 130, may compare the resource 104 against the previous resources that are determined to have successfully accomplished similar tasks for the requester in the past, to generate the predicted resource fitment for the resource 104 for the selected task.

According to some embodiments, the resource rankings are presented to the resource 104 (508).

With the information on the resource rankings and the resource fitment prediction, the resource 104 has the option to confirm or withdraw their bid (509). For example, if the resource rankings does not rank the resource 104 favorably, the resource 104 has the option to withdraw their bid without losing their submitted point value. When the resource rankings favor the resource 104, the resource 104 has the option to also confirm their bid. According to other embodiments, the resource ranking is only presented to the project manager to aid in their decision of choosing a resource to allocate to the completion of the task. According to some embodiments, the decision to confirm or withdraw the bid may be extended to the requester of the selected task (e.g., task manager), so that the requester may reject the resource 104 for the selected task based on the resource ranking and/or the predicted resource fitment.

As shown by a fourth chat window 624 included within the chat bot area 620 of the screen 600, the task assistant 125 may further inquire the resource 104 for additional information to propose recommended tasks.

Figure 7:
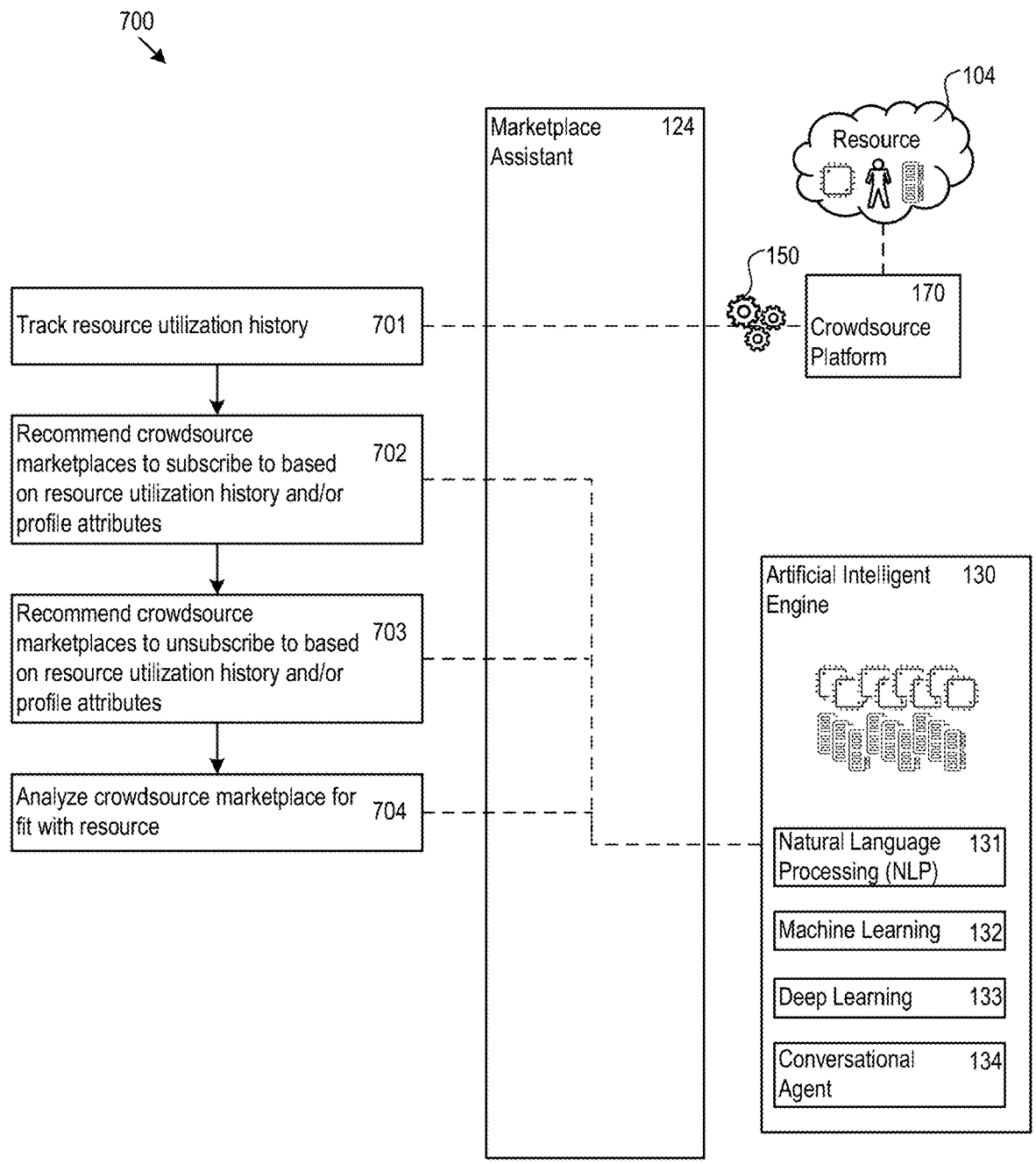
FIG. 7 shows another exemplary flow diagram of logic that the architecture may implement.

FIG. 7 shows a flow diagram 700 of logic describing an exemplary process for the CASS 101 to provide assistance to, for example, the resource 104 on the crowdsource platform 170. One or more of the processes included in the flow diagram 700 may be attributed to the marketplace assistant 124 of the CASS 101.

The marketplace assistant 124 tracks the utilization history of the resource 104 as the resource 104 bids on tasks posted to the crowdsource platform 170, and accomplishes tasks that are assigned through the crowdsource platform 170 (701). Included within the tracking of the utilization history of the resource 104, may be the tracking of performance attributes assigned to the resource 104 for having completed past tasks.

Based on the utilization history and/or the profile information of the resource 104, the marketplace assistant 124 recommends one or more marketplaces within the crowdsource platform 170 (702). The recommended marketplaces to subscribe to are determined by the marketplace assistant 124 to offer task opportunities that are predicted to be of interest to the resource 104 or a good fit from a skills perspective for the resource 104.

Figure 8:
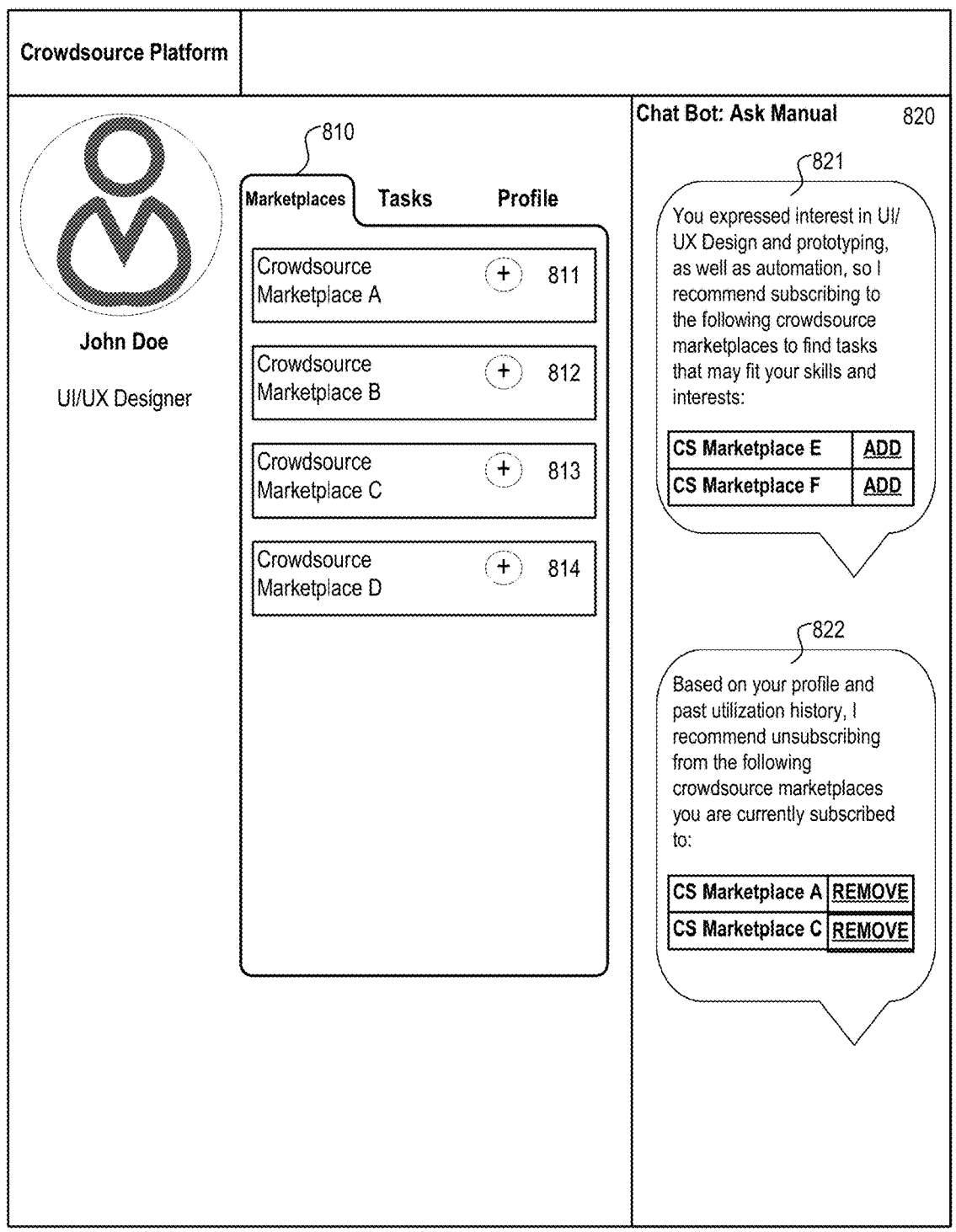
FIG. 8 shows a screen of an exemplary GUI presenting assistive features.
Figure 12:
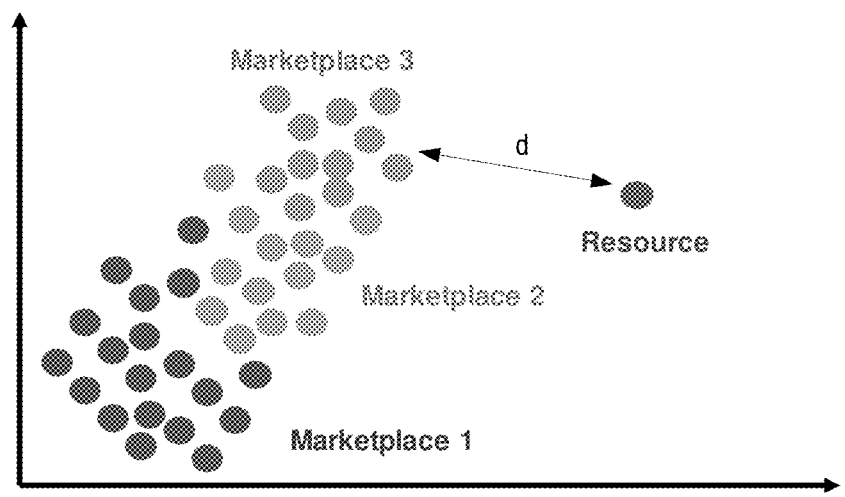
FIG. 12 shows an exemplary clustering graph.

Each of the marketplaces hosted on the crowdsource platform 170 may be tailored for a specific purpose, such as an industry, type of work, or enterprise client. FIG. 8 shows a screen 800 of an exemplary GUI generated by the crowdsource platform 170 for enabling the resource 104 to subscribe and unsubscribe from marketplaces hosted on the crowdsource platform 170. The screen 800 includes a marketplace tab 810 that includes a list of marketplaces that the resource 104 is currently subscribed to. Portions of the screen 800 are controlled by the marketplace assistant 124 to provide assistive features to the resource 104. For example, a chat bot area 820 is controlled by the marketplace assistant 124. The chat bot area 820 includes a first chat window 821 that presents a list of marketplaces recommended by the marketplace assistant 124 for the resource 104 to subscribe to. Selecting the add option will subscribe the resource 104 to the respective marketplace. The AI engine 130 may select recommended marketplaces based on a text clustering approach where each marketplace is defined by textual information provided by the crowdsource platform 170, and mapped as points in space on a graph. The resource 104 is also defined by textual information provided by the resource's profile, and mapped as a point in space on the same graph. Then the marketplace with clustered points closest to the point representing the resource 104 will be selected as a recommended marketplace (e.g., shortest distance on the graph between a marketplace cluster and the resource point). FIG. 12 shows an exemplary graph 1200 implementing this text clustering approach, where marketplace 3 would be selected as a recommended marketplace due to having the shortest distance d to the resource point.

Based on the utilization history and/or the profile information of the resource 104, the marketplace assistant 124 also recommends one or more marketplaces within the crowdsource platform 170 to unsubscribe from (703). The recommended marketplaces to unsubscribe from are determined by the marketplace assistant 124 to not offer task opportunities that are predicted to be of interest to the resource 104 or a good fit from a skills perspective for the resource 104. In the screen 800, a second chat window 822 presents a list of one or more marketplaces recommended by the marketplace assistant 124 to unsubscribe from. Selecting the remove option will unsubscribe the resource 104 from the respective marketplace.

Figure 9:
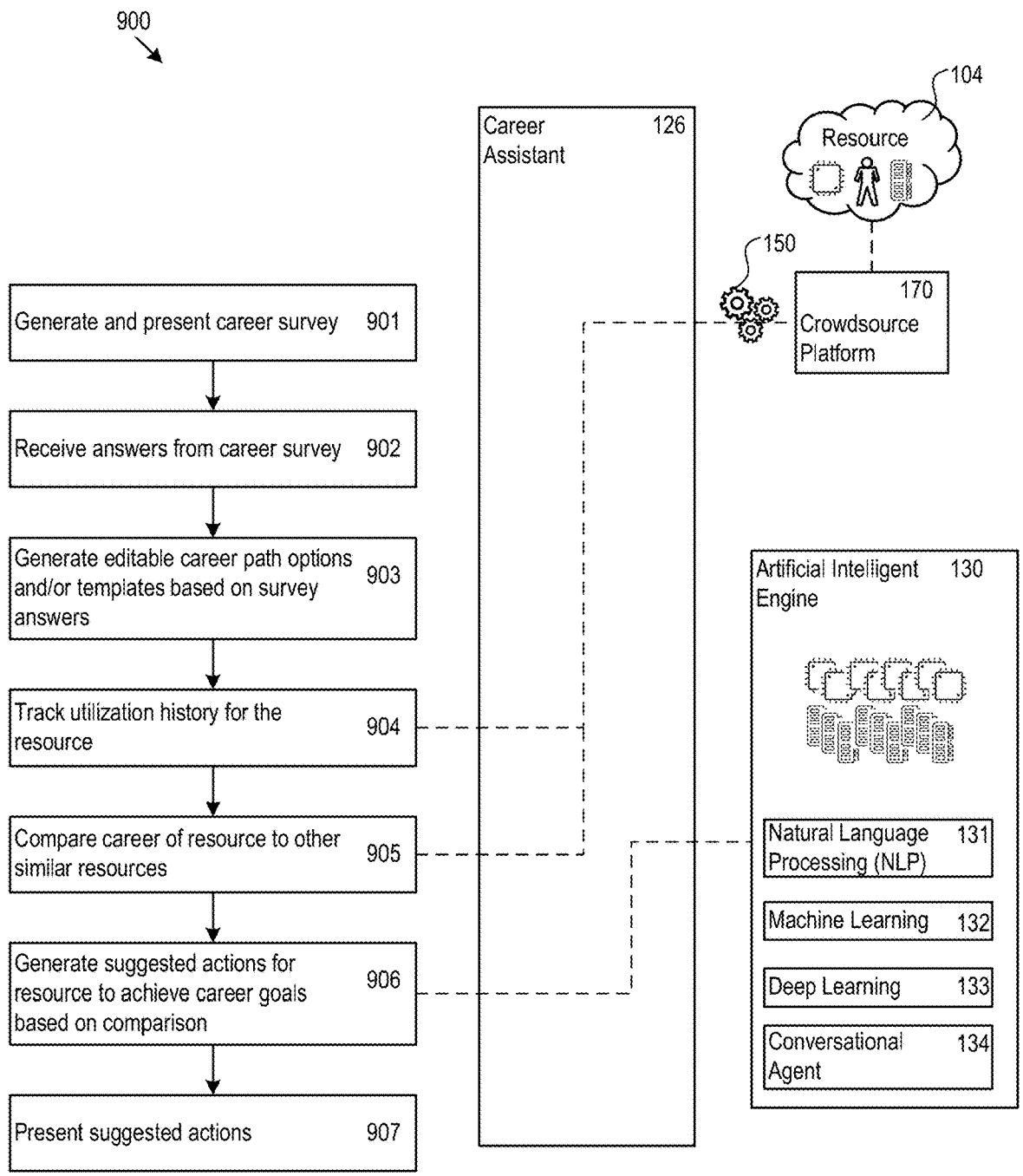
FIG. 9 shows another exemplary flow diagram of logic that the architecture may implement.

FIG. 9 shows a flow diagram 900 of logic describing an exemplary process for the CASS 101 to provide assistance to the resource 104 on the crowdsource platform 170. One or more of the processes included in the flow diagram 300 may be attributed to the career assistant 126 of the CASS 101.

The career assistant 126 generates a career survey that includes one or more survey fields for the resource 104 to fill in with responses, and presents the career survey to the resource 104 (901). The survey fields may ask a question for the resource 104 to answer related to career goals and interests. The career assistant 126 then receives answers to the career survey from the resource 104 (902).

Based on the received answers to the career survey from the resource 104, the career assistant 126 determines an understanding of the resource's 104 career goals, and generates a career path template that offers recommended options for the resource 104 to undertake to achieve their career goals (903). The career path template may be comprised of a set of intermingling nodes, where each node represents a career action available to the resource, and where each node is connected to one or more other nodes via an edge, where the edge represents an action being taken or not. The resource 104 may apply a sequence decision making process (e.g., Markov Decision Process) on the nodes and edges to arrive at a career goal. The resource 104 is able to edit the different node connections to revise their career path template to their liking.

The career assistant 126 tracks the utilization history of the resource 104 as the resource 104 bids on tasks posted to the crowdsource platform 170, and accomplishes tasks that are assigned through the crowdsource platform 170 (904). Included within the tracking of the utilization history of the resource 104, may be the tracking of performance attributes assigned to the resource 104 for having completed past tasks.

The career assistant 126 also tracks the utilization history of other resources on the crowdsource platform 170, and compares the utilization history of the resource 104 to the utilization history of other resources on the crowdsource platform 170 that are determined to be similar to the resource 104 (905).

Based on the comparison of utilization histories, the career assistant 126 generates suggested actions for the resource 104 to achieve their career goals (906). The suggested actions include actions taken by the similar resources to achieve career goals that are similar to the resource 104. The suggested actions are then presented to the resource 104 (907).

Figure 10:
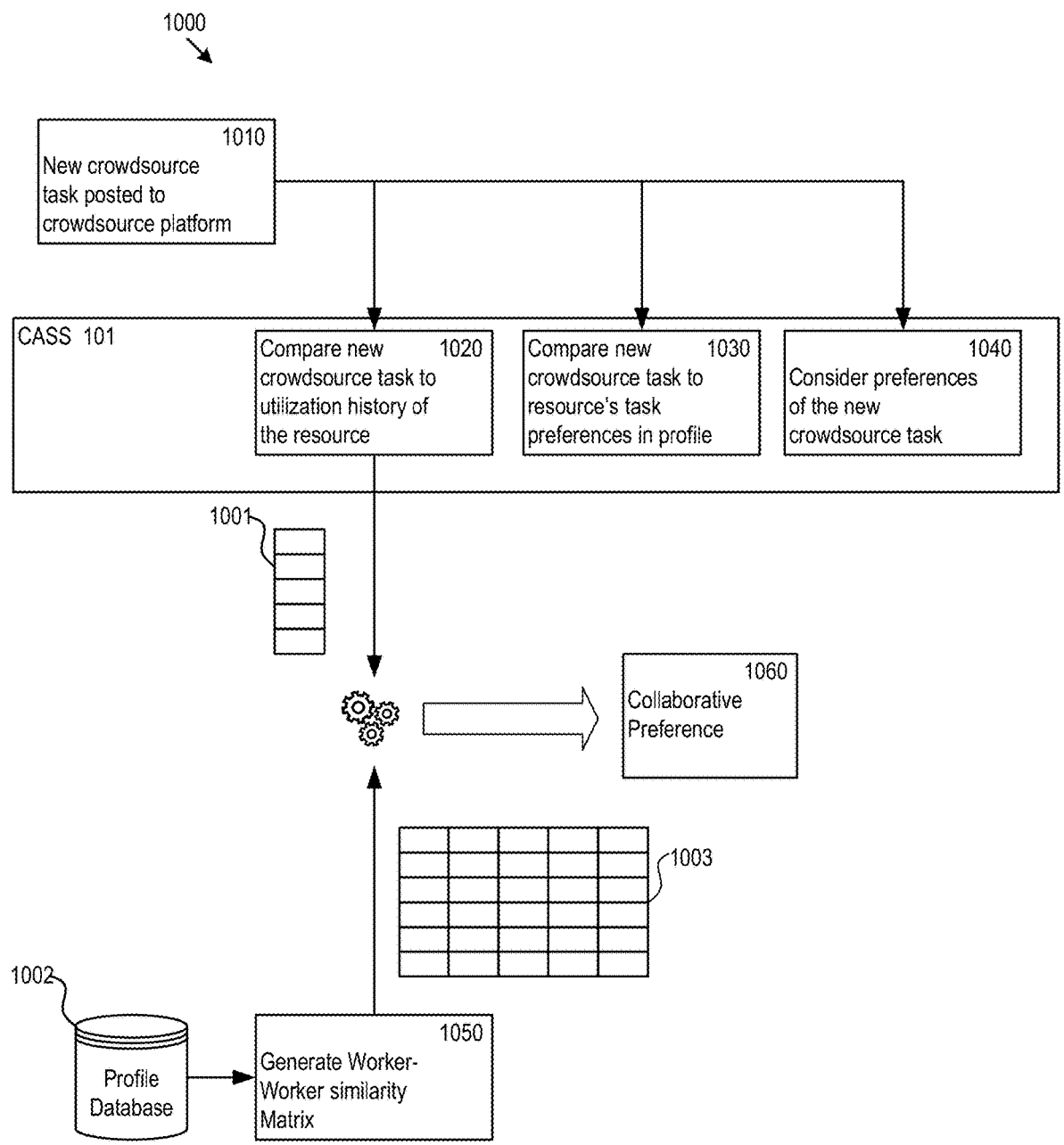
FIG. 10 shows a data flow diagram that may be implemented on the global network architecture.

FIG. 10 shows a data flow diagram 1000 of logic describing an exemplary process for the CASS 101 to provide assistance to, for example, the resource 104 on the crowdsource platform 170. In particular, the data flow diagram 1000 describes a process implemented by the CASS 101 for determining a collaborative preference 1060 for the resource 104, which includes determining a predictive similarity between the resource 104 and various other metrics such as other resources on the crowdsource platform 170 and tasks that are posted to the crowdsource platform 170. The collaborative preference 1060 is a representation of a comparison between the resource 104 and other resources within the crowdsource platform 170 that are determined to be similar to the resource 104.

Task attributes are extracted from a selected task posting (e.g., task title and task description) on the crowdsource platform 170 (1010). The extraction of task attributes is implemented, in part, by the NLP engine 131. The NLP engine 131 applies known NLP models (e.g., Doc2Vec) that include preprocessing the textual data from the selected task posting, tokenizing the textual data to identify key words, removing stop words from the textual data, stemming the textual data, and generating an inferred vector as an output, where the inferred vector is a representation of the task posting. The resulting outputs from the task posting extraction process includes a taskDescriptionVector representing an inferred vector of the task description, and a taskTitleVector representing an inferred vector of the task title. The machine learning engine 132 may apply machine learning algorithms to train the NLP models to produce more accurate inferred vector outputs in a faster amount of time.

The past utilization history of the resource 104 is individually analyzed in view of the task from the selected task posting (1020). The past utilization history of the resource 104 includes information on tasks completed by the resource 104 in the past. Thus, the past utilization history of the resource 104 (e.g., description of past tasks, title of past tasks, duration of past tasks, budget of past tasks, billing rate of the resource 104 on past tasks, skill of the resource 104 and the required skill on past tasks) is compared against the attributes of the current task (e.g., askDescriptionVector and taskTitleVector) to determine a similarity score between the current task and the tasks that have been completed by the resource 104 in the past. The output is a past task similarity vector 1001, where each element in the past task similarity vector 1001 is a similarity score representing a similarity between the current task and a respective task previously completed by the resource 104. The similarity may be a cosine similarity determined by the AI engine 130.

The profile information from the resource's 104 is analyzed in view of the task from the selected task posting (1030). The CASS 101 receives various profile information from the resource's 104 profile (e.g., past utilization history, completed tasks, billed tasks, reward points earned, hours worked on tasks, profile summary), and compares the profile information against attributes of the task from the selected task posting (e.g., askDescriptionVector and taskTitleVector), to determine a similarity between the resource 104 and the task from the selected task posting.

Preferences of the project manager having posted the selected task posting is analyzed in view of the resource 104 (1040). The CASS 101 receives various profile information from the resource's 104 profile (e.g., past utilization history, completed tasks, billed tasks, reward points earned, hours worked on tasks, profile summary), and compares the profile information against profile information of resources that have previously selected by the project manager, to determine a compatibility of the resource 104 to the task from the selected task posting by measuring how similar the resource 104 is to the resources previously selected by the project manager.

To determine a similarity between resources on the crowdsource platform 170, the CASS 101 generates a worker-worker similarity matrix 1003 that maps a similarity between two or more resources on the crowdsource platform 170 (1050). A worker is a specific type a resource. An exemplary worker-worker similarity matrix 1100 is shown in FIG. 11, where each row and column represents a different worker ($w_i$), and an intersection provides a similarity score between the two intersecting workers. The highest similarity is found at the intersection of the same workers (e.g., intersection of row $w_3$ and column $w_3$ shows a similarity score of 1, the highest similarity score because the same worker is being compared. Outside of comparing the same worker, row $w_3$ shows that worker $w_3$ shares the highest similarity with worker $w_2$, and shares the least amount of similarity with worker $w_5$. The similarity scores may be based on a comparison of profile information extracted from the profile database 1002 that stores profiles of resources within the crowdsource platform 170.

A collaborative preference 1060 takes into account both the past task similarity vector 1001 and the worker-worker similarity matrix 1003, to generated a weighted average of the of the similarity scores in the past task similarity vector 1001 that are related to resources that are similar to resource 104. As an equation, the collaborative preference 1060 may be:

$$\text{collaborative Preference}(w_c, t_c) = \frac{\sum_{\forall w_k \in W_s} similarWorkerScore(w_c, w_k) * pastTaskSimilarityScore(w_k, t_c)}{\sum_{\forall w_k \in W_s} similarWorkerScore(w_c, w_k)}$$

where $t_c$ refers to a feature vector for the task from the selected task posting, and $W_s$ is a selection of the top n similar workers to resource 104 from the worker-worker similarity matrix 1003.

For evaluation purposes of the CASS 101, when the resource 104 results in being selected by the project manager to complete a task, or when the resource 104 selects a task that is recommended by the CASS 101, the resource 104 is labeled as being FIT for that task upon completion of the task. When the resource 104 is not selected by the project manager to complete a task, or when the resource 104 does not select a task that is recommended by the CASS 101, the resource 104 is labeled as being NOT FIT for that task. The FIT/NOT FIT evaluation is propagated through machine learning models by the AI engine 130 for all resource and task pairings within the crowdsource platform 170. The machine learning models provide training on past evaluation results that can be used by the CASS 101 to predict future recommendations of tasks to the resources that have a higher probability of being positively received by the resources.

An approach similar to the one taken to generate the collaborative preference 1060 may be taken to generate the recommended billing rate. The recommended billing rate may be generated according to:

$$\text{Billing\_Rate}(w_c) = \frac{\sum_{\forall w_k \in W_s} similarity\_score(w_c, w_k) * \text{Billing\_Rate}(w_k)}{\sum_{\forall w_k \in W_s} similarity\_score(w_c, w_k)}$$

Here, the recommended billing rate generated for the resource 104 is an estimation based on the billing rate of other resources that are similar to the resource 104. The estimation is a weighted average taken over the billing rate of the top n similar workers to resource 104 from the worker-worker similarity matrix 1003, as represented by $W_s$.

The methods, devices, processing, circuitry, and logic described above may be implemented in many different ways and in many different combinations of processes, hardware, and/or software that include more or less than the specific embodiments disclosed herein. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and controlled, may be incorporated into a single memory or database, may be logically and physically organized in many different ways, and may be implemented in many different ways. In other implementations, any of the databases may be part of a single database structure, and, more generally, may be implemented logically or physically in many different ways. Each of the databases defines tables storing records that the control instructions 222 read, write, delete, and modify to perform the processing noted herein. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry. Various implementations have been specifically described. However, many other implementations are also possible.

What is claimed is:

1. An enterprise server computer comprising:
   a communication interface configured to:
      communicate over a network with a crowdsource platform and communicate over the network with a resource included on the crowdsource platform; and receive over the network, from the crowdsource platform, profile information corresponding to the resource;

assistance circuitry coupled to the communication interface, the assistance circuitry configured to:
receive, through the communication interface, the profile information;
determine a sample resource, also on the crowdsource platform, is similar to the resource based on the profile information and sample profile information corresponding to the sample resource;
implement a comparison of the profile information with the sample profile information corresponding to the sample resource, the comparison performed with an artificial intelligence engine that is continuously trained with past performance data to generate profile update recommendations, wherein the artificial intelligence engine includes a natural language processing (NLP) engine, a machine learning engine, a deep learning engine, and a conversational agent;
generate, using the artificial intelligence engine, a plurality of profile recommendations based on the comparison and a goal of the resource, each of the profile recommendations being a different recommended revision to the profile information of the resource and including at least part of the sample profile information of the sample resource that has previously achieved the goal;
analyze, using the artificial intelligence engine, a utilization history of the resource to determine skills possessed by the resource not included in the profile information of the resource, and include the determined skills in the plurality of profile recommendations; and presentation circuitry configured to:
generate a profile recommendation window within the crowdsource platform, the profile recommendation window including the profile recommendations as user selectable options; and
update the profile information on the crowdsource platform with a recommended revision to the profile information corresponding to the resource in response to receipt of a selection from the profile recommendation window of one of the user selectable options,
wherein the assistance circuitry is further configured to:
control, using the conversational agent, a chat bot to generate conversational messages displayed on a graphical user interface (GUI);
extract, using the NLP engine applying NLP models, task attribute information from a task posted on the crowdsource platform, and generate a task description vector representing an inferred vector of a task description of the posted task and a task title vector representing an inferred vector of a task title of the posted task;
train, using the machine learning engine applying machine learning algorithms, the NLP models to produce more accurate inferred vectors of the task description and task title;
compare, using the artificial intelligence engine, the utilization history of the resource against the extracted task attribute information, and generate a past task similarity vector including a similarity score representing a similarity between the posted task and a respective task previously completed by the resource;
generate a worker-worker similarity matrix based on a similarity between the resource and other resources on the crowdsource platform, wherein each row and column of the worker-worker similarity matrix represents a different worker, and each intersection of each row and each column of the worker-worker similarity matrix provides a similarity score between two intersecting workers;
generate a collaborative preference based on the past task similarity vector and the worker-worker similarity matrix; and
determine, using the artificial intelligence engine, the posted task is of interest to the resource based on the collaborative preference, wherein the presentation circuitry is further configured to:
generate a task recommendation window within the crowdsource platform, the task recommendation window including a task area presenting the posted task as a user selectable option and a chat bot area presenting a message related to the posted task, and
wherein the assistance circuitry is further configured to:
in response to a detection of a selection of the posted task from the resource, label the resource as being fit for the posted task upon completion of the task;
in response to a detection of a non-selection of the posted task from the resource, label the resource as being not fit for the posted task; and
provide training, using the machine learning engine, on past fit/not fit labels to predict future recommendations of tasks to the resource.

2. The enterprise server computer of claim 1, wherein the assistance circuitry is further configured to:
generate a profile summary based on the profile information, the profile summary generated by the assistance circuitry within the crowdsource platform to emulate a profile summary of the sample resource.

3. The enterprise server computer of claim 1, wherein the assistance circuitry is further configured to:
parse task attribute information corresponding to tasks posted within the crowdsource platform as being available for bidding;
implement a comparison of the profile information against the task attribute information;
predict, with the artificial intelligence engine, recommended tasks that are of interest to the resource based on the comparison, the recommended tasks included in the tasks posted within the crowdsource platform; and
select an available task from the recommended tasks included in the tasks posted within the crowdsource platform based on a prediction; and
wherein the presentation circuitry is further configured to:
generate a task recommendation window within the crowdsource platform, the task recommendation window including the available task.

4. The enterprise server computer of claim 3, wherein the assistance circuitry is further configured to:
detect a selection of the available task from the resource;
parse the crowdsource platform for other resources that have bid on the same available task;
parse profile information corresponding to the other resources; and
generate, with the artificial intelligence engine, a ranking of resources, including the resource and the other resources, in an order of predicted match of respective resources with the available task based on the profile information corresponding to the other resources, the profile information corresponding to the resource, and identified requirements of the available task.

5. The enterprise server computer of claim 1, wherein the assistance circuitry is further configured to:
parse the utilization history for the resource; and
generate a marketplace recommendation based on marketplaces selected by the artificial intelligence engine for adding a new marketplace subscription, the marketplaces selected by the artificial intelligence engine based on the utilization history and the profile information and mapping textual information included in the profile information as points in space in a graph.

6. The enterprise server computer of claim 1, wherein the assistance circuitry is further configured to:
parse the utilization history for the resource;
predict, with the artificial intelligence engine, task opportunities of interest for the resource; and
generate a marketplace recommendation for removing an existing marketplace subscription based on: the utilization history of the existing marketplace subscription by the resource, absence of predicted task opportunities of interest for the resource from the existing marketplace subscription, and the profile information.

7. The enterprise server computer of claim 1, wherein the assistance circuitry is further configured to:
extract task attribute information from an available task posted within the crowdsource platform;
determine a past task preference based on a comparison of the task attribute information with the utilization history of the resource;
determine a profile preference based on a comparison of the task attribute information with profile information of the resource;
determine a task poster preference based on a comparison of the resource and other resources utilized by a task poster of the available task posting; and
generate a past task preference vector corresponding to the resource based on one of the past task preference, the profile preference, the task poster preference, or a combination thereof.

8. The enterprise server computer of claim 1, wherein the profile information received over the network, from the crowdsource platform comprises a vector representing profile information corresponding to the resource, the profile information input to the crowdsource platform and used to generate the vector, the vector representing textual data included in the profile information.

9. The enterprise server computer of claim 1, wherein the artificial intelligence engine is further configured to reference the goal of the resource to generate the recommended revision to increase a probability that the goal is achieved.

10. The enterprise server computer of claim 3, wherein the artificial intelligence engine is further configured to analyze the utilization history of the resource and the profile information of the resource and generate a recommended billing rate of the resource for the available task.

11. A method for assisting a resource on a crowdsource platform, the method comprising:
receiving, over a network from a crowdsource platform, profile information associated with the resource on the crowdsource platform;
determining a sample resource is similar to the resource based on the profile information corresponding to the resource and sample profile information corresponding to the sample resource, wherein both the resource and the sample resource are within the crowdsource platform;
implementing a comparison of the profile information with the sample profile information corresponding to the sample resource, the comparison performed with an artificial intelligence engine that is continuously trained with past performance data to generate profile update recommendations, wherein the artificial intelligence engine includes a natural language processing (NLP) engine, a machine learning engine, a deep learning engine, and a conversational agent;
generating, using the artificial intelligence engine, a plurality of profile recommendations based on the comparison and a goal of the resource, each of the profile recommendations being a different recommended revision to the profile information of the resource and including at least part of the sample profile information of the sample resource that has previously achieved the goal;
analyzing, using the artificial intelligence engine, a utilization history of the resource to determine skills possessed by the resource not included in the profile information of the resource, and including the determined skills in the plurality of profile recommendations;
controlling, using the conversational agent, a chat bot to generate conversational messages displayed on a graphical user interface (GUI);
extracting, using the NLP engine applying NLP models, task attribute information from a task posted on the crowdsource platform, and generating a task description vector representing an inferred vector of a task description of the posted task and a task title vector representing an inferred vector of a task title of the posted task;
training, using the machine learning engine applying machine learning algorithms, the NLP models to produce more accurate inferred vectors of the task description and task title;
comparing, using the artificial intelligence engine, the utilization history of the resource against the extracted task attribute information, and generating a past task similarity vector including a similarity score representing a similarity between the posted task and a respective task previously completed by the resource;
generating a worker-worker similarity matrix based on a similarity between the resource and other resources on the crowdsource platform, wherein each row and column of the worker-worker similarity matrix represents a different worker, and each intersection of each row and each column of the worker-worker similarity matrix provides a similarity score between two intersecting workers;
generating a collaborative preference based on the past task similarity vector and the worker-worker similarity matrix;
determining, using the artificial intelligence engine, the posted task is of interest to the resource based on the collaborative preference;
generating a profile recommendation window within the crowdsource platform, the profile recommendation window including the profile recommendations as user selectable options;
updating the profile information on the crowdsource platform with a recommended revision to the profile information corresponding to the resource in response to receipt of a selection from the profile recommendation window of one of the user selectable options;

generating a task recommendation window within the crowdsource platform, the task recommendation window including a task area presenting the posted task as a user selectable option and a chat bot area presenting a message related to the posted task;

in response to a detection of a selection of the posted task from the resource, labelling the resource as being fit for the posted task upon completion of the task;

in response to a detection of a non-selection of the posted task from the resource, labelling the resource as being not fit for the posted task; and providing training, using the machine learning engine, on past fit/not fit labels to predict future recommendations of tasks to the resource.

12. The method of claim 11, further comprising:

generating a profile summary within the crowdsource platform based on the profile information to emulate a profile summary of the sample resource.

13. The method of claim 11, further comprising:

parsing task attribute information corresponding to tasks posted within the crowdsource platform as being available for bidding;

implementing a comparison of the profile information against the task attribute information;

predicting, with the artificial intelligence engine, recommended tasks that are of interest to the resource based on the comparison, the recommended tasks included in the tasks posted within the crowdsource platform;

selecting an available task from the recommended tasks included in the tasks posted within the crowdsource platform based on a prediction; and generating a task recommendation window within the crowdsource platform, the task recommendation window including the available task.

14. The method of claim 13, further comprising:

detecting a selection of the available task from the resource;

parsing the crowdsource platform for other resources that have bid on the same available task;

parsing profile information corresponding to the other resources; and generating, with the artificial intelligence engine, a ranking of resources, including the resource and the other resources, in an order of predicted match of respective resources with the available task based on the profile information corresponding to the other resources, the profile information corresponding to the resource, and identified requirements of the available task.

15. The method of claim 11, further comprising:

parsing the utilization history for the resource;

selecting, with the artificial intelligence engine, marketplaces based on the utilization history and the profile information and mapping textual information included in the profile information as points in space in a graph; and generating a marketplace recommendation for adding a new marketplace subscription based on the marketplaces selected with the artificial intelligence engine.

16. The method of claim 11, further comprising:

parsing the utilization history for the resource;

predicting, with the artificial intelligence engine, task opportunities of interest for the resource; and generating a marketplace recommendation for removing an existing marketplace subscription based on: the utilization history of the existing marketplace subscription by the resource, absence of predicted task opportunities of interest for the resource from the existing marketplace subscription, and the profile information.

17. The method of claim 11, further comprising:

extracting task attribute information from an available task posted within the crowdsource platform;

determining a past task preference based on a comparison of the task attribute information with the utilization history of the resource;

determining a profile preference based on a comparison of the task attribute information with profile information of the resource;

determining a task poster preference based on a comparison of the resource and other resources utilized by a task poster of the available task posting; and generating a past task preference vector corresponding to the resource based on one of the past task preference, the profile preference, the task poster preference, or a combination thereof.

* * * * *